(12) United States Patent
Shiotsuka et al.

(10) Patent No.: US 8,049,645 B2
(45) Date of Patent: Nov. 1, 2011

(54) CYLINDRICAL COVER-ATTACHED ENCODER APPARATUS

(75) Inventors: Ai Shiotsuka, Okayama (JP); Yoshihiko Yamaguchi, Okayama (JP)

(73) Assignee: Uchiyama Manufacturing Corp., Okayama (JP)

( * ) Notice: Subject to any disclaimer, the term of this patent is extended or adjusted under 35 U.S.C. 154(b) by 0 days.

(21) Appl. No.: 12/885,880

(22) Filed: Sep. 20, 2010

(65) Prior Publication Data

US 2011/0006923 A1 Jan. 13, 2011

Related U.S. Application Data

(63) Continuation of application No. 12/500,111, filed on Jul. 9, 2009, now abandoned, which is a continuation of application No. 12/230,919, filed on Sep. 8, 2008, now abandoned, which is a continuation of application No. 11/905,835, filed on Oct. 4, 2007, now abandoned, which is a continuation of application No. 11/649,803, filed on Jan. 5, 2007, now abandoned, which is a continuation of application No. 11/439,992, filed on May 25, 2006, now abandoned, which is a continuation of application No. 10/959,084, filed on Oct. 7, 2004, now abandoned.

(30) Foreign Application Priority Data

Oct. 7, 2003 (JP) .................................. 2003-348172

(51) Int. Cl.
*H03M 1/22* (2006.01)
(52) U.S. Cl. .......................................................... 341/15
(58) Field of Classification Search .................... 341/15; 348/446, 448, 482, 486, 544; 277/549, 592
See application file for complete search history.

(56) References Cited

U.S. PATENT DOCUMENTS

| | | | | |
|---|---|---|---|---|
| 3,678,567 A | * | 7/1972 | Manilla et al. | 29/DIG. 47 |
| 3,939,241 A | * | 2/1976 | Powell et al. | 29/423 |
| 6,789,948 B2 | * | 9/2004 | Nakajima | 384/448 |
| 2002/0140418 A1 | * | 10/2002 | Ichiman | 324/174 |
| 2004/0036631 A1 | * | 2/2004 | Kayao | 341/15 |
| 2004/0174160 A1 | * | 9/2004 | Tomioka | 324/207.22 |
| 2005/0058376 A1 | * | 3/2005 | Oohira et al. | 384/448 |

FOREIGN PATENT DOCUMENTS

WO 03012456 A1 2/2003

* cited by examiner

*Primary Examiner* — Howard Williams
(74) *Attorney, Agent, or Firm* — Wenderoth, Lind & Ponack, L.L.P.

(57) ABSTRACT

A cylindrical cover-attached encoder apparatus, including a magnetic metal-based body having a cylindrical shape, a magnetic rubber-based encoder having a cylindrical shape and formed around the outer peripheral surface of said magnetic metal-based cylindrical body, and a nonmagnetic material-based cover having a cylindrical shape and adapted to be mounted on said magnetic rubber-based encoder for covering the outer peripheral surface of the cylindrical portion of said magnetic rubber-based encoder.

8 Claims, 3 Drawing Sheets

CYLINDRICAL COVER-ATTACHED ENCODER APPARATUS

This application is a continuation of U.S. application Ser. No. 12/500,111, filed Jul. 9, 2009 now abandoned, which is a continuation of U.S. application Ser. No. 12/230,919, filed Sep. 8, 2008, now abandoned, which is a continuation of U.S. application Ser. No. 11/905,835, filed Oct. 4, 2007, now abandoned, which is a continuation of U.S. application Ser. No. 11/649,803, filed Jan. 5, 2007, now abandoned, which is a continuation of U.S. application Ser. No. 11/439,992, filed May 25, 2006, now abandoned, which is a continuation of U.S. application Ser. No. 10/959,084, filed Oct. 7, 2004, now abandoned.

BACKGROUND

1. Field of the Invention

The present invention relates to an encoder apparatus, or more specifically an encoder that is included in the encoder apparatus as one of its components, wherein the encoder apparatus may be mounted on a rotational member in an automotive vehicle (such as between the outer and inner races of the wheel bearing unit on the driving shaft or driven shaft) for detecting the number of revolutions of the rotational member.

2. Description of the Prior Art

One example of the conventional encoder apparatus that may be mounted on a rotational member in the automotive vehicle by pressing the encoder apparatus into the rotational member for detecting the number of revolutions of the rotational member is disclosed in Japanese patent application as now published under No. 62 (1987)-25267, for example, wherein the encoder apparatus includes an encoder in the form of a magnetic signal generator ring.

As described in the above document, the magnetic signal generator ring is based on a synthetic resin material that is mechanically strong enough to avoid any possible damages that might occur on the ring as it is pressed into the rotational member, and includes an annular synthetic resin magnet that is buried around the outer peripheral surface of the ring. The synthetic resin magnet takes the form of a multipole magnet having S polarities and N polarities magnetized alternately at equal intervals in the circumferential direction.

As the encoder apparatus is mounted on the rotational member in the manner described above, the encoder in the encoder apparatus may be placed to face opposite the sensor that is located adjacently to the encoder outside it.

As the rotational member on which the encoder apparatus is mounted is thus rotating at the number of revolutions that is changing every moment, the encoder may magnetically produce pulses each of which represent the respective ever-changing number of revolutions and the sensor may detect the ever-changing number of revolutions by responding to each of the pulses.

In the conventional encoder apparatus described above, however, there is a risk that some extraneous matter such as stones might enter the area between the encoder in the encoder apparatus and the sensor located to face opposite the encoder outside it. This extraneous matter such as stones might become engaged between the encoder and the sensor, and thus cause damage to the encoder.

The side of the encoder facing opposite the sensor is magnetized as described above, acting as the magnetized surface having alternate N polarities and S polarities at equal intervals. If this magnetized surface is damaged by the extraneous matter such as stones which enter the area between the encoder and sensor, the sensor would not be able to detect the number of revolutions correctly because the encoder would fail to function properly. Thus, this presents a serious disadvantage.

Another example of the conventional encoder apparatus that includes an encoder known as the annular encoder is disclosed in Japanese patent application as now published under No. 2001-241435, wherein the encoder apparatus may be mounted on a rotational member, such as between the inner and outer races of the bearing unit rotating relative to each other, so that it can detect the number of revolutions. In this conventional encoder apparatus, the encoder is covered by a nonmagnetic cover on the side thereof facing opposite the sensor in order to avoid damaging the encoder as described above. Other examples of the encoder apparatus are disclosed in Japanese patent applications as now published under No. H5 (1993)-249126, No. H11 (1999)-303879, and No. 2002-286739, respectively.

In recent years, the encoder apparatus that may be mounted on a rotational member on the automotive vehicle by pressing the encoder apparatus into the rotational member for detecting the ever-changing number of revolutions for the rotational member has more often been used with the FF (front engine, front drive) vehicle in particular, in which the encoder apparatus is mounted on the drive shaft and the like, and is used under the more severe running or ambient conditions.

SUMMARY OF THE INVENTION

In order to avoid damaging the encoder in the encoder apparatus when it is mounted on the rotational member by pressing it into the rotational member, there are demands for an encoder apparatus that includes an encoder that is mechanically strong enough to permit the encoder to withstand any severe or vigorous ambient or running conditions, thereby protecting the encoder from such damages more securely.

In order to solve the problems associated with the prior art encoder apparatus as described above, the present invention proposes to provide a cylindrical cover-attached encoder apparatus that includes a magnetic metal-based body having the cylindrical shape, a magnetic rubber-based encoder having the cylindrical shape and formed around the cylindrical portion of the magnetic metal-based cylindrical body, and a nonmagnetic material-based cover having the cylindrical shape and mounted on the magnetic rubber-based encoder for covering the outer peripheral surface of the cylindrical portion of the encoder.

It may be understood that as the cylindrical cover-attached encoder apparatus according to the present invention includes the magnetic rubber-based cylindrical encoder that may be formed around the cylindrical portion of the magnetic metal-based cylindrical body, it can have the improved mechanical strength that enables the encoder apparatus to be mounted on the rotational member without causing any damage to the encoder in the encoder apparatus when the encoder apparatus is pressed into the rotational member.

It may also be understood that as the magnetic rubber-based cylindrical encoder has its outer peripheral side covered by the nonmagnetic material-based cover, it can be protected from any unfavorable ambient conditions outside it, and it can withstand any severe or vigorous running or ambient conditions for an extended period of the time without causing any damages, even when it is used under such conditions.

The cylindrical encoder that constitutes one component of the cylindrical cover-attached encoder apparatus according to the present invention may be any type of the encoder that is known to any person skilled in the relevant art. For example, the cylindrical encoder may be formed by preparing ferrite magnetic powders (such as strontium ferrite powder, barium ferrite powder and the like) or rare earth magnetic powders (such as a combination of neodymium, iron and boron, a combination of samarium, iron and nitrogen and the like), adding any of the above powders to elastic element such as synthetic rubber or synthetic resin, mixing them together, and molding the mixture into the cylindrical shape by using the vulcanizing, molding process. Then, said molded cylindrical shape may be magnetized so that S polarities and N polarities appear alternately at equal intervals in the circumferential direction thereof. Finally, the multipole encoder having the cylindrical shape can be obtained. This cylindrical encoder may then be attached to the magnetic metal-based cylindrical body by using any adhesive medium.

It should be noted that the ferrite magnetic powder or rare earth magnetic powder and the elastic element such as synthetic rubber or synthetic resin may preferably have the composition ratio range of between 70% and 95% by weight.

The synthetic rubber that may be based on the encoder may include NBR, H-NBR, ACM, AEM, FKM, EPDM and the like.

As an alternative form of the cylindrical encoder, it may be obtained in the following steps. The preliminary foundation processing may be conducted on the magnetic metal-based cylindrical body, an adhesive medium may be applied onto the thus foundation processed cylindrical body, and the rubber material containing the magnetic materials mentioned above may be bonded to the cylindrical body by the vulcanizing, molding and bonding process. Finally, the cylindrical encoder thus obtained may be magnetized as described above.

Desirably, the metal-based body having the cylindrical shape around on which the magnetic rubber-based encoder having the cylindrical shape is formed may be made from magnetic material because the magnetic force that may be provided by the magnetic rubber-based encoder formed around the outer peripheral surface of the cylindrical body can be supplemented.

In the cylindrical cover-attached encoder apparatus described above in accordance with the present invention, the magnetic metal-based cylindrical body should preferably be formed by using any of the sintered metals. The sintered metal can be worked into any desired shape, and this can be done with the high dimensional precision. Specifically, the inner and outer peripheral surfaces of the sintered metal-based cylindrical body can be formed with the drastically enhanced dimensional precision. In short, the sintered metal can meet both the high precision magnetizing requirements and the mechanical strength requirements, and the cylindrical body can be secured in position with the high stability.

In the cylindrical cover-attached encoder apparatus described above in accordance with the present invention, the magnetic metal-based cylindrical body may also be formed by using any of the steels.

In cases where the magnetic metal-based cylindrical body must be formed with reduced thickness, it is preferable to form the magnetic metal-based cylindrical body by using a steal material. In those cases, the cylindrical cover-attached encoder apparatus that includes the cylindrical body based on the steel material can ensure the required mechanical strength. For example, the magnetic metal-based cylindrical body may be formed by using low carbon steel such as SPCC, SPCE and the like or ferrite stainless steel such as SUS430, SUS430JIL and the like.

In any of the before described cylindrical cover-attached encoder apparatus of the present invention, one end of the cylindrical portion of the nonmagnetic material-based cover covering the outer peripheral side of the encoder in the encoder apparatus may be extended beyond the cylindrical portion of the encoder in the axial direction of the magnetic metal-based cylindrical body, and the cover may then be attached to the encoder by swaging the one end of the cylindrical portion of the cover extending beyond the cylindrical portion of the encoder axially.

This swaging operation ensures that the nonmagnetic material-based cover can be attached to the encoder in a simplified way so that the cover can cover the encoder from the outside. This also ensures that the cover and encoder can be positioned relative to each other correctly and securely without being misaligned.

In any of the above-described cylindrical cover-attached encoder apparatus of the present invention, it is desirable that the nonmagnetic material-based cylindrical cover has the thickness of between 0.1 mm and 0.6 mm. In this way, the transmission of the magnetic force from the encoder through the cover can be improved, and the cover can be attached to the encoder correctly and easily by the swaging operation.

In order to permit the nonmagnetic material-based cover to meet the requirements for the performance and mechanical strength, it may be formed by using SUS304, Al, CuZn, Cu and the like.

In the cylindrical cover-attached encoder apparatus of the present invention, the magnetic rubber-based cylindrical encoder may be formed around the outer peripheral surface of the cylindrical portion of the magnetic metal-based cylindrical body, and thus the mechanical strength of the encoder apparatus can be increased so remarkably that any damages that would otherwise occur when the encoder apparatus is pressed into a particular rotational member on the automotive vehicle can be avoided.

The outer peripheral side of the magnetic rubber-based cylindrical encoder may be covered by the nonmagnetic material-based cover, and thus the encoder can be protected more securely from the outside.

As such, the cylindrical cover-attached encoder can withstand the more severe or vigorous running or ambient conditions for an extended period of the time without causing any damages, even when it is used under such conditions.

In accordance with any forms of the cylindrical cover-attached encoder apparatus of the present invention, the magnetic rubber-based encoder can be protected completely from the risk of any of the stones, sands, mud, dirty water and the like coming from the outside and hitting the encoder in the encoder apparatus, and any wear or breakage that would be caused by those stones, etc. can be avoided. Thus, the encoder in the encoder apparatus can be operating properly even under unfavorable environmental conditions almost permanently, and can provide pulses that represent the number of revolutions accurately. Thus, those pulses from the encoder can be transmitted through the nonmagnetic material-based cover, and can be detected accurately by the sensor.

It may be understood from the foregoing description that one end of the cylindrical portion of the nonmagnetic material-based cover covering the outer peripheral side of the encoder is extending beyond the cylindrical portion of the encoder in the axial direction of the magnetic metal-based cylindrical body. And, the cover may be attached to the encoder simply by swaging the one end of the cylindrical portion of the cover extending axially beyond the cylindrical portion of the encoder, thereby the nonmagnetic material-based cover can cover the encoder from outside it. This swaging operation can be carried out to ensure that the cover can be positioned correctly relative to the encoder without being misaligned.

It may be appreciated from the foregoing description that the cylindrical cover-attached encoder apparatus of the present invention may be used with the FF vehicle, for example, although it may also be used with other types of vehicles such as FR (front engine, rear drive) vehicle and RR (rear engine, rear drive) vehicle. In any case, the encoder apparatus can be mounted on the drive shaft, in which the magnetic rubber-based encoder can have its magnetized surface protected by the nonmagnetic material-based cover, and can withstand any severe or vigorous running or environmental conditions for an extended period of the time, even when it is used under such conditions. Despite such unfavorable situation, the encoder in the encoder apparatus of the present invention can produce pulses that represent the number of revolutions correctly, and the sensor can detect the number of revolutions accordingly by responding to the pulses.

DETAILED DESCRIPTION OF THE INVENTION

The following describes several particular preferred embodiments of the cylindrical cover-attached encoder apparatus according to the present invention by referring to the accompanying drawings.

Embodiment 1

The cylindrical cover-attached encoder apparatus according to the first embodiment of the present invention includes the components that will be described specifically below.

As one component of the encoder apparatus, a magnetic metal-based cylindrical body 1 may be formed by using a sintered metal of magnetic materials.

As another component of the encoder apparatus, an encoder may be formed in the following steps. A ferrite magnetic powder (such as strontium ferrite powder, barium ferrite powder and the like) and a rubber chemical are prepared, and may be added to NBR (acrylonitrile butadiene rubber). Note that the strontium ferrite powder has the composition ratio of 88% by weight relative to the other elements. Then, they may be mixed together, and a rubber in its unvulcanized state may thus be obtained. Finally, this rubber is placed in a mold where it may be vulcanized, shaped into an encoder 2, and bonded to the outer peripheral surface of the cylindrical body 1, as shown in FIG. 1 (*a*).

Figure 1A:
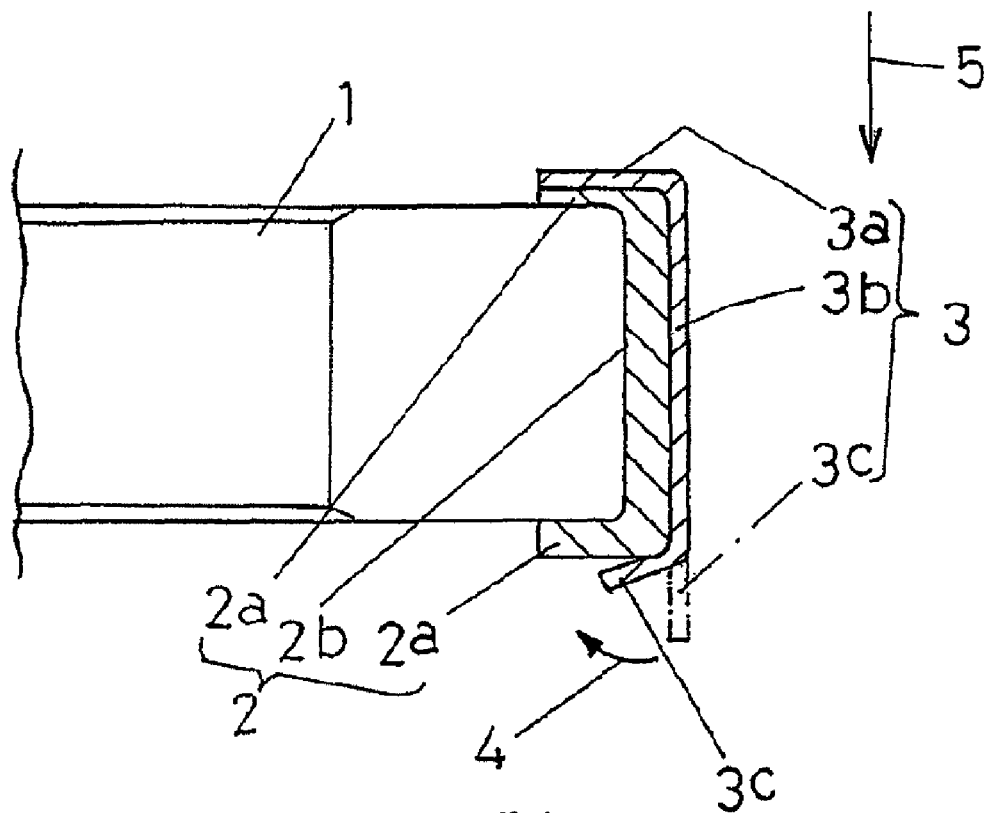
FIG. 1 (*a*) is a longitudinal sectional view of a preferred embodiment of the cylindrical cover-attached encoder apparatus according to the present invention, although some non-critical parts or elements are not shown, and FIG. 1 (*b*) is a plan view of the cylindrical cover-attached encoder apparatus shown in FIG. 1 (*a*)
Figure 1B:
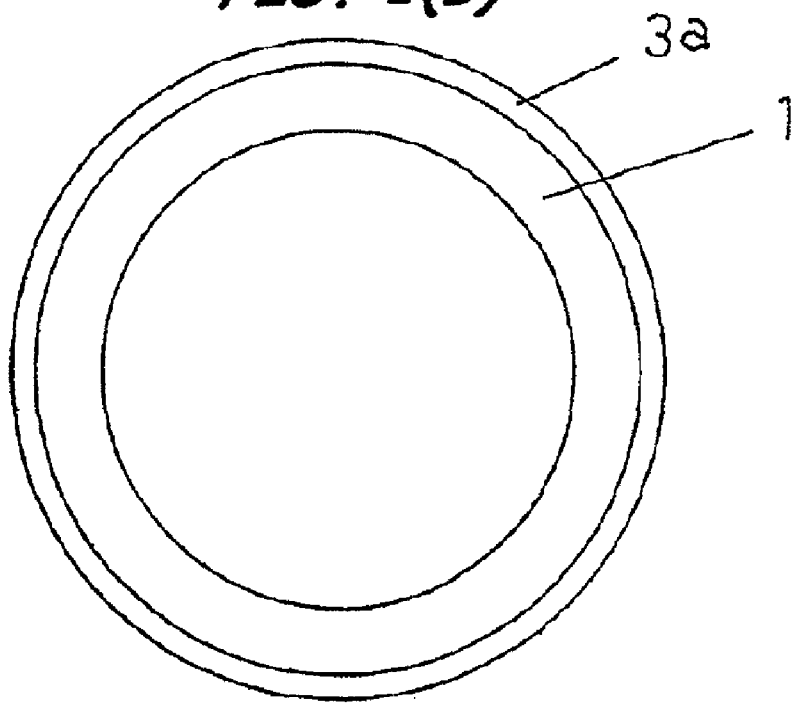

In this embodiment, as shown in FIG. 1 (*a*), the encoder 2 may be formed to have a cylindrical portion 2*b* and annular portions 2*a*, 2*a*, in which the cylindrical portion 2*b* may be bonded to the outer peripheral surface of the cylindrical portion of the cylindrical body 1 and the annular portions 2*a*, 2*a* may be bonded to the upper lateral surface and lower lateral surface of the cylindrical body 1, respectively, during the vulcanizing, molding and bonding process.

Then, the cylindrical portion 2*b* of the encoder 2 thus obtained may be magnetized to have S polarities and N polarities alternately at equal intervals in the circumferential direction. Thus, the multipole encoder 2 may be obtained. In this way, this multipole encoder 2 includes the magnetic rubber that is formed around the outer peripheral surface of the cylindrical portion of the magnetic metal-based cylindrical body 1.

As still another component of the encoder apparatus, a cylindrical cover 3 may be provided by using SUS304 steel plate of 0.3 mm thickness, for example. As it may be seen from FIG. 1 (*a*), the cylindrical cover 3 has an annular portion 3*a*.

This cylindrical cover 3 may be mounted to the outer peripheral side of the cylindrical encoder 2 formed around the outer peripheral surface of the cylindrical portion of the cylindrical body 1, this mounting being made in the direction of an arrow 5 in FIG. 1 (*a*).

As it may be seen from FIG. 1 (*a*), the cylindrical cover 3 has an end 3*c* extending beyond the cylindrical portion 2*b* of the encoder 2 in the axial direction of the magnetic metal-based cylindrical body 1.

The cylindrical cover-attached encoder apparatus may be completed by swaging the end 3*c* of the cylindrical cover 3 toward the direction of an arrow 4, thereby attaching the cover 3 to the encoder 2.

In this embodiment, as shown in FIG. 1 (*a*), the cylindrical encoder 2 based on the magnetic rubber may be formed around the outer peripheral surface of the cylindrical body 1, and the cylindrical cover 3 may then be mounted around the outer peripheral side of the cylindrical portion 2*b* of the cylindrical encoder 2, so that the inner peripheral wall of the cover 3 can engage the outer peripheral side of the cylindrical encoder 2, and finally the cover 3 may be attached to the encoder 2 by swaging the end 3*c* of the cover 3. The cylindrical body 1, the cylindrical encoder 2 and the cylindrical cover 3 are thus combined together into a single unit, thus completing the cylindrical cover-attached encoder apparatus of the present invention. Specifically, the cylindrical cover-attached encoder apparatus includes the cylindrical encoder 2, the magnetic metal-based cylindrical body 1, and the non-magnetic material-based cylindrical cover 3 in such a way that the cylindrical encoder 2 is held like a sandwich between the magnetic metal-based cylindrical body 1 and the nonmagnetic material-based cylindrical cover 3.

Therefore, in the cylindrical cover-attached encoder apparatus of the present invention of this embodiment 1, the cylindrical encoder 2 made of magnetic rubber is strengthen by the cylindrical body 1 made of magnetic metal, and the outer peripheral side of the cylindrical encoder 2 made of magnetic rubber is covered by the cylindrical cover 3 made of nonmagnetic material.

By the above-described configuration, in terms of the mechanical strength, the encoder 2 can be reinforced by the cylindrical body 1. Furthermore, the encoder 2 can be protected by the nonmagnetic metal-based cylindrical cover 3 from the outside. This permits the encoder apparatus to be positioned correctly when it is mounted on any rotational member on the automotive vehicle. Also, when it is used in conjunction with the sensor, the encoder 2 can provide the number of revolutions correctly, which can be detected by the sensor accordingly.

Figure 2:
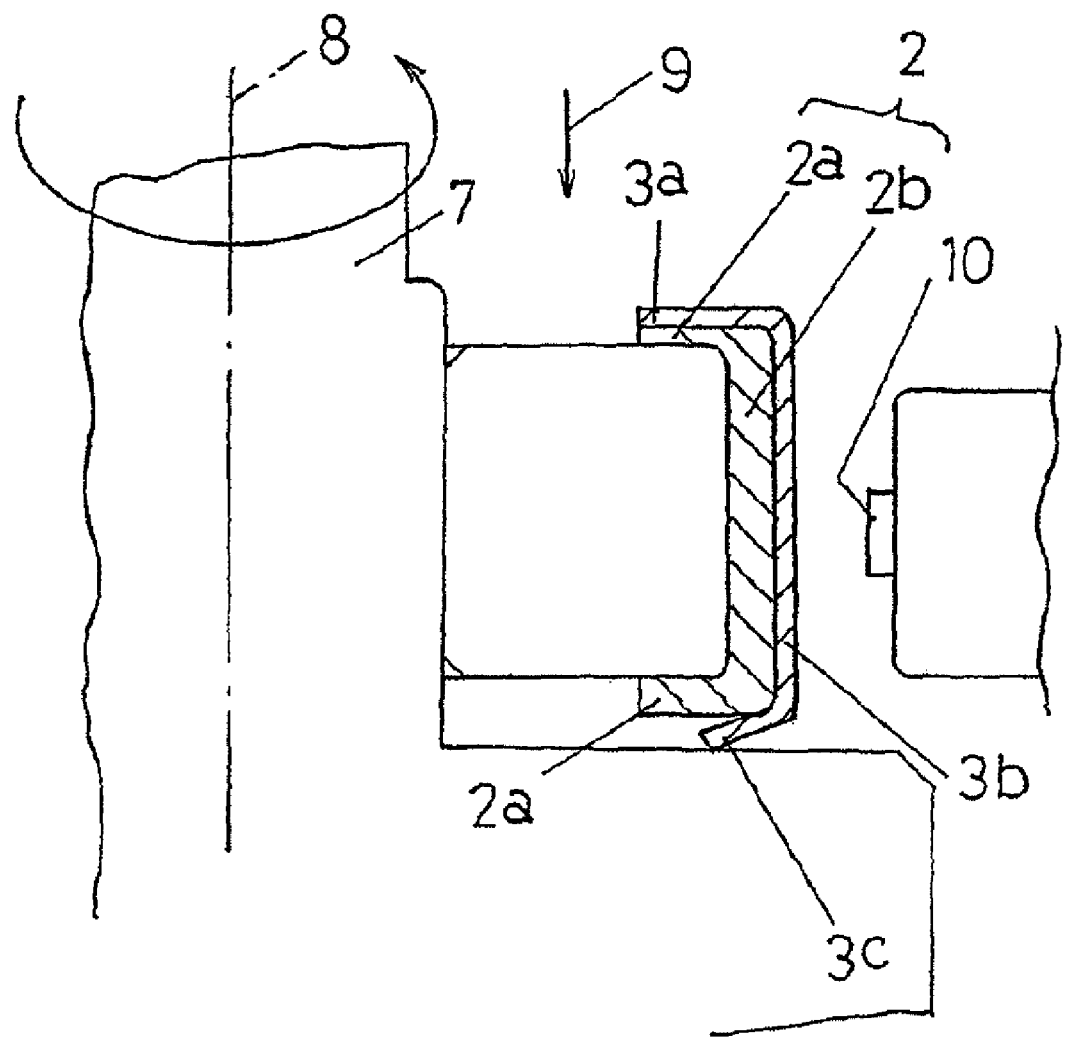
FIG. 2 is a longitudinal sectional view of another preferred embodiment of the cylindrical cover-attached encoder apparatus according to the present invention, showing how the encoder apparatus of FIG. 1 may be mounted on a rotational member in the automotive vehicle, although some non-critical parts or elements are not shown.

The following describes how the encoder apparatus according to this embodiment can be used. In the following description, it is supposed that the encoder apparatus is used with FF (front engine, front drive) automotive vehicle. Then, the encoder apparatus may be mounted on a particular rotational member, such as a drive shaft 7, by pressing the encoder apparatus into the drive shaft 7 in the direction of an arrow 9 in FIG. 2. With the encoder apparatus being mounted on the drive shaft 7 as shown in FIG. 2, the sensor 10 may be placed adjacently to the outer peripheral side of the cylindrical portion 3b of the cover 3. This ensures that the encoder 2 and sensor 10 can be operational for an extended period of the time so that the sensor 10 can detect the number of revolutions by responding to the pulses emitted from the encoder 2 mounted on the outer periphery of the drive shaft 7 rotating about the rotary axis 8.

Embodiment 2

Figure 3:
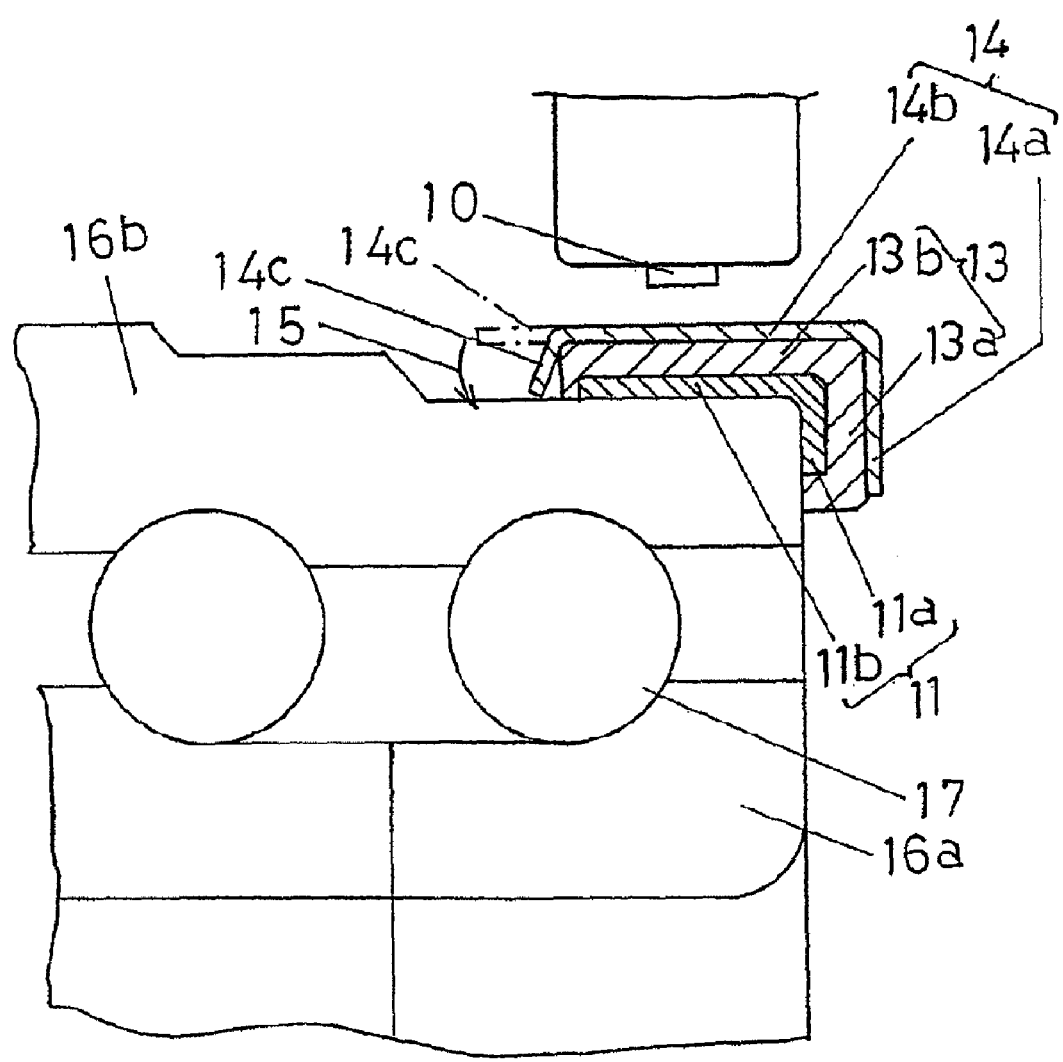
FIG. 3 is a longitudinal sectional view of still another preferred embodiment of the cylindrical cover-attached encoder apparatus, showing how the encoder apparatus may be mounted on a rotational member in the automotive vehicle, although some non-critical parts or elements are not shown.

In this embodiment, it is assumed that the cylindrical cover-attached encoder apparatus may be mounted on a rotational member, such as a bearing unit including the inner and outer races rotating relative to each other through the rollers interposed between the inner and outer races. As shown in FIG. 3, a cylindrical core metal is provided so that it can be mounted on the outer periphery of the outer race of the bearing unit, and an encoder is provided so that it can be formed on the outer periphery of the core metal. A nonmagnetic material-based cylindrical cover is provided so that it can be attached to the outer peripheral side of the encoder by using the swaging process.

It may be seen from FIG. 3 that the encoder apparatus is mounted on the wheel bearing unit on the driven shaft, including the inner race 16a and outer race 16b rotating relative to each other though the intervening rollers 17.

As a component of the encoder apparatus, a cylindrical core metal 11 may be provided by using a low carbon steel such as SPCC. The cylindrical core metal 11 may be formed to include a cylindrical portion 11b and a flange portion 11a. The cylindrical portion 11b is placed on the outer periphery of the rotating outer race 16b of the wheel bearing unit. The flange portion 11a is extending inwardly (the left side in FIG. 3) in the radial direction from the axial outer end (the upper side in FIG. 3) of the cylindrical portion 11b.

Then, the preliminary foundation processing may be conducted on the outer peripheral surface of the cylindrical core metal 11, onto which an adhesive medium may be applied.

As another component of the encoder apparatus, a cylindrical encoder may be formed in the following steps. A ferrite magnetic powder (such as a mixture of strontium ferrite powder and barium ferrite powder) and a rubber chemical are prepared, and may be added to H-NBR (hydrogen-added acrylonitrile butadiene rubber). Note that the ferrite magnetic powder has the composition ratio of 88% by weight relative to the other elements. Then, they may be mixed together, and a rubber in its unvulcanized state may thus be obtained. Finally, this rubber is placed in a mold where it may be vulcanized, shaped into the magnetic rubber-based cylindrical encoder 13, and bonded on the outer peripheral surface of the cylindrical core 11.

In this embodiment, as shown in FIG. 3, the magnetic rubber-based cylindrical encoder 13 includes a cylindrical portion 13b and an annular portion 13a, and the vulcanizing, molding and bonding process may be carried out on the cylindrical encoder 13 with its cylindrical portion 13b being bonded to the outer peripheral side of the cylindrical portion 11b of the core metal 11 and the annular portion 13a being bonded to the flange portion 11a of the metal core 11.

Then, the magnetic rubber-based cylindrical encoder 13 may be magnetized so that S polarities and N polarities appear alternately at equal intervals in the circumferential direction of the cylindrical portion 13b, and may be provided on the outer peripheral surface of the cylindrical portion 11b of the SPCC steel-based cylindrical core metal 11.

As still another component of the encoder apparatus, a cylindrical cover 14 may be provided by using a SUS304 steel plate of 0.3 mm thickness, including a cylindrical portion 14b and a flange portion 14a extending inwardly (the left side in FIG. 3) in the radial direction from the axial outer end (the upper end in FIG. 3) of the cylindrical portion 14b.

Then, the SUS304 steel-based cylindrical cover 14 may be mounted on the outer peripheral side of the cylindrical encoder 13 formed on the outer periphery of the cylindrical portion 11b of the cylindrical core metal 11, in the same manner as described for the preceding embodiment 1.

The cylindrical cover 14 has an end 14c extending beyond the cylindrical portion 13b of the encoder 13 in the axial direction of the cylindrical portion 11b of the core metal 11, and may be attached to the encoder 13 by swaging the end 14c in the direction of an arrow 15. The cylindrical cover-attached encoder apparatus is thus completed.

Similarly to the preceding embodiment 1, the cylindrical magnetic rubber-based encoder 13 is firmly held like a sandwich as shown in FIG. 3. Therefore, in the cylindrical cover-attached encoder apparatus of the present invention, the cylindrical encoder 13 made of magnetic rubber is strengthen by the core metal 11 made of magnetic metal, and the outer peripheral side of the cylindrical encoder 13 made of magnetic rubber is covered by the cylindrical cover 14 made of nonmagnetic material. So that, in terms of the mechanical strength, the encoder 13 can be reinforced by the core metal 11. Furthermore, the encoder 13 can be protected by the nonmagnetic metal-based cylindrical cover 14 from the outside. This permits the encoder apparatus to be positioned correctly when it is mounted on any rotational member on the automotive vehicle. Also, when it is used in conjunction with the sensor, the encoder 13 can provide the number of revolutions correctly, which can be detected by the sensor accordingly.

The cylindrical cover-attached encoder apparatus thus obtained in accordance with this embodiment may be mounted on a particular rotational member in the automotive vehicle, such as the outer race 16b of the wheel bearing unit on the driven shaft. With the encoder apparatus being mounted on the outer race 16b as shown in FIG. 3, the sensor 10 may be placed adjacently to the outer peripheral side of the cylindrical portion of the cover 14. This ensures that the encoder 13 and sensor 10 can be operational for an extended period of the time so that the sensor 10 can detect the number of revolutions by responding to the pulses emitted from the encoder 13 mounted on the outer periphery of the outer race 16b of the rotating bearing unit.

Although the present invention has been described so far with reference to several particular preferred embodiments thereof, it should be understood that various changes and modifications may be made to those embodiments without departing from the spirit and scope of the invention as defined in the appended claims.

What is claimed is:

1. A cylindrical cover-attached encoder apparatus comprising:
- a magnetic metal-based body formed from a sintered metal;
- a magnetic rubber-based encoder formed around an outer peripheral surface of said magnetic metal-based body; and
- a nonmagnetic material-based cover mounted on said magnetic rubber-based encoder and covering an outer peripheral surface of the cylindrical portion of said magnetic rubber-based encoder.

2. The cylindrical cover-attached encoder apparatus of claim 1, wherein the magnetic metal-based body has a cylindrical shape including an end face and an annular side wall, and
wherein the magnetic rubber-based encoder extends over the end face of the magnetic metal-based body, and has an annular portion which extends over the annular side wall of the magnetic metal-based body.

3. The cylindrical cover-attached encoder apparatus of claim 2, wherein one end of the cylindrical portion of said nonmagnetic material-based cover which covers the outer peripheral surface of the magnetic rubber-based encoder extends beyond the annular portion of the magnetic rubber-based encoder in a radial direction of the magnetic metal-based body, and
wherein the nonmagnetic material-based cover is attached to the magnetic rubber-based encoder by swaging the one end of the cover which extending beyond the annular portion of the magnetic rubber-based encoder.

4. The cylindrical cover-attached encoder apparatus of claim 1, wherein the nonmagnetic material-based cover has a thickness of 0.3 mm.

5. The cylindrical cover-attached encoder apparatus of claim 4, wherein one end of the cylindrical portion of said nonmagnetic material-based cover which covers the outer peripheral surface of the magnetic rubber-based encoder extends beyond an annular portion of the magnetic rubber-based encoder in a radial direction of the magnetic metal-based body, and
wherein the nonmagnetic material-based cover is attached to the magnetic rubber-based encoder by swaging the one end of the cover which extending beyond the annular portion of the magnetic rubber-based encoder.

6. The cylindrical cover-attached encoder apparatus of claim 1, wherein the magnetic rubber-based encoder includes rubber and 88 wt % ferrite magnetic powder.

7. The cylindrical cover-attached encoder apparatus of claim 6, wherein one end of the cylindrical portion of said nonmagnetic material-based cover which covers the outer peripheral surface of the magnetic rubber-based encoder extends beyond an annular portion of the magnetic rubber-based encoder in a radial direction of the magnetic metal-based body, and
wherein the nonmagnetic material-based cover is attached to the magnetic rubber-based encoder by swaging the one end of the cover which extending beyond the annular portion of the magnetic rubber-based encoder.

8. The cylindrical cover-attached encoder apparatus of claim 1, wherein one end of the cylindrical portion of said nonmagnetic material-based cover which covers the outer peripheral surface of the magnetic rubber-based encoder extends beyond an annular portion of the magnetic rubber-based encoder in a radial direction of the magnetic metal-based body, and
wherein the nonmagnetic material-based cover is attached to the magnetic rubber-based encoder by swaging the one end of the cover which extending beyond the annular portion of the magnetic rubber-based encoder.

* * * * *